United States Patent [19]
Holmes

[11] 3,737,669
[45] June 5, 1973

[54] HIGH PRECISION READING DEVICE OF THE GRADUATION OF A PRECISION RULER

[75] Inventor: Peter Holmes, Geneva, Switzerland

[73] Assignee: Societe Genevoise D'Instruments De Physique, Geneva, Switzerland

[22] Filed: Sept. 15, 1970

[21] Appl. No.: 72,493

Related U.S. Application Data

[62] Division of Ser. No. 640,212, May 22, 1967, Pat. No. 3,590,260.

[30] Foreign Application Priority Data

Aug. 25, 1966 Switzerland..........................12343/66

[52] U.S. Cl................................250/231 R, 356/170
[51] Int. Cl............................G01b 11/04, G01d 5/34
[58] Field of Search.............................250/206, 231; 356/170

[56] References Cited

UNITED STATES PATENTS

| | | | |
|---|---|---|---|
| 2,880,512 | 4/1959 | Fenemore et al.............. | 250/213 X |
| 3,042,804 | 7/1962 | Koulikovitch.................. | 250/206 |
| 3,254,227 | 5/1966 | Hock............................... | 356/170 |
| 3,305,691 | 2/1967 | Hock............................... | 250/231 |

FOREIGN PATENTS OR APPLICATIONS 686,274   1/1953   Great Britain

Primary Examiner—James W. Lawrence
Assistant Examiner—T. N. Grigsby
Attorney—Young and Thompson

[57] ABSTRACT

A device for reading the graduations of rulers with high precision, including a photoelectric microscope having an optical sighting device, in which the measuring field on either side of a fixed centered position is periodically scanned and a photoelectric cell receives rays from the scanned surface of the ruler and delivers a train of optical pulses. In the focal plane of the ruler and on the optical path of the microscope, a cylindrical diaphragm is disposed which has a helical slot movable between plural positions corresponding to portions of the measuring field centered on different scale markings of the ruler so as to give a non-recurrent reading or optical signal indicative of a portion of an interval between two scale markings on the ruler.

3 Claims, 2 Drawing Figures

HIGH PRECISION READING DEVICE OF THE GRADUATION OF A PRECISION RULER

This application is a division of copending application Ser. No. 640,212, filed May 22, 1967 now U.S. Pat. No. 3,590,260.

The present invention has for its object a high precision reading device of the graduation of a precision ruler, comprising a photoelectric microscope, means enabling a periodical scanning of the measuring field, on either side of a stationary centered position, as well as a photoelectric cell receiving the relfected rays by—or transmitted through—the surface of the precision ruler.

Such high precision reading devices are known and described for example in the British Pat. No. 686,274 and are satisfactory when used as zero reading devices, that is to say enabling to determine with precision the coincidence of a movable member with a predetermined position.

However, when it is desired to follow up the displacement of a movable member in reading at each moment its successive positions, one has to resort either to complex devices of the type described in U.S. Pat. No. 3,042,804 and which permit restricted area of displacement only, or to devices in which the photoelectric microscope is mounted on a carriage which is able to displace itself parallelly to the movable member over a distance at least equal to the interval comprised between two strokes of the graduation of a ruler.

These last devices enable theoretically to follow up a movable member in its displacement; it suffices in fact to displace the photoelectric microscope conjointly with the movable member to be followed, over a distance at least equal to that separating two strokes of the ruler, then to replace rapidly the photoelectric microscope in its starting position for which it sights the following stroke of the ruler. These fast return strokes of the photoelectric microscope raise problems which are practically not to be solved as soon as the speed of displacement of the movable member is appreciable.

The present invention has for its object a high precision reading device of the graduation of a precision ruler tending to remedy the recited drawbacks. This reading device comprises a photoelectric microscope presenting: an optical sighting device, means enabling a periodical scanning of the measuring field on either side of a stationary centered position; and a photoelectric cell receiving the rays reflected by the surface of—or transmitted through—the precision ruler and delivering a train of electrical pulses, characterized by the fact that it presents, located on the optical axis of the photoelectric microscope and optically conjugated with the precision ruler, a field diaphragm displaceable between two positions corresponding to portions of the measuring field centered on two different strokes of the graduation of the precision ruler.

The attached drawings show schematically and by way of example two embodiments and some variants of the reading device according to the present invention.

Figure 1:
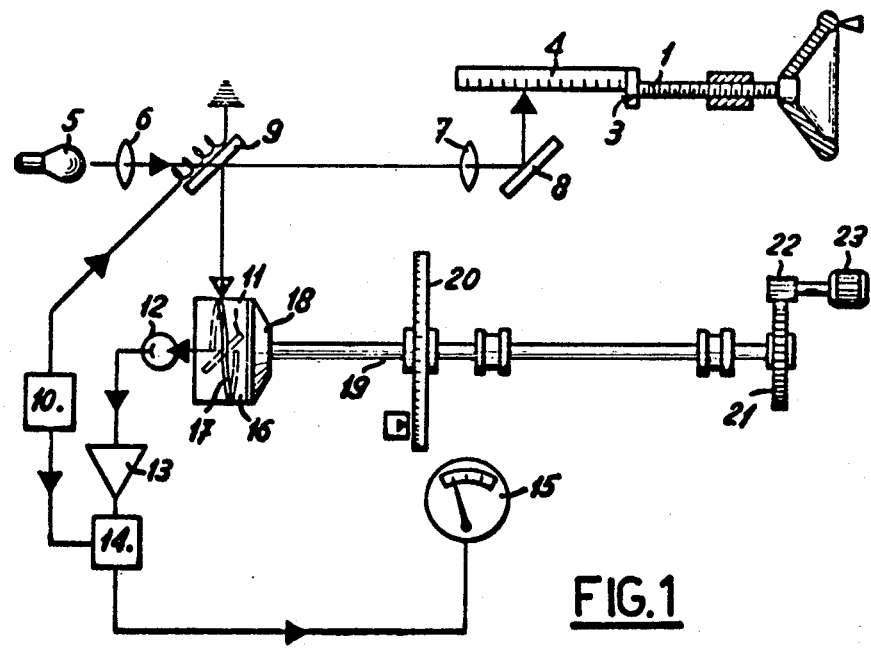
FIG. 1 is a diagram of the first embodiment of the reading device.

The diagram of FIG. 1 shows the principle of a machine equipped with the reading device. This machine comprises displacement means, represented by a screw 1, enabling to move a movable member (not shown) carrying a precision ruler 4.

The high precision reading device of the graduation of a precision ruler, enabling to make the necessary readings for the measure of a displacement, comprises a photoelectric microscope presenting an optical sighting device, means permitting a periodical scanning of the measuring field on either side of a stationary centered position as well as a photoelectric cell receiving light from the image of the ruler and delivering a train of electrical pulses.

In the example shown, the optical sighting device comprises a light source 5 and a condenser 6 emitting a pencil of parallel rays which, after having traversed a magnifying lens 7, is reflected by means of a mirror 8 directing this pencil onto the reflecting surface of the precision ruler 4.

The rays reflected by the ruler are deflected by the mirror 8 and pass through the lens 7. These reflected rays are returned at right angle by a deflector constituted in the example shown by a mirror 9 oscillating at the frequency of 50 cycles per second for example, located between the condenser 6 and the lens 7 and the upper edge of which is located on the axis of the incident pencil of rays.

The deflector is driven in its periodical oscillations, by means of a generator 10 is known way for example as described in the British Pat. No. 686,274. This deflector causes thus a scanning of the measuring field through the pencil of rays or luminous spot in a known manner.

The rays reflected by the mirror 9 of the deflector are sent back by the intermediary of a mirror 11 onto a photoelectric cell 12. This photoelectric cell 12 is connected electrically to an amplifier 13 which feeds the input of a phase comparator 14 the other input of which is fed by the generator 10. The output of this phase comparator 14 feeds a measuring instrument 15, the indication of which is proportional to the phase difference between the reference pulses delivered by the generator 10 and the pulses delivered by the photoelectric cell 12. This electronic apparatus is known and will not be described here in detail; it is for example described in the British Pat. No. 686,274 cited above.

The reading device comprises further a field diaphragm 16, that is to say a mask disposed before the photoelectric cell 12 at distance such that it is located in the conjugated plane of the ruler 4 through the lens 7, thus in the plane of the real image of this ruler. This diaphragm is provided with a helical slot limiting the explored field of the ruler. This field diaphragm 16 is displaceable in such a way that its slot or its aperture, passes from a position for which it defines a portion of the field centered on a stroke (n) of the graduation of the ruler 4, to another position for which it defines a portion of field centered on a stroke (n + 1) adjacent the said graduation. The lateral displacement of the aperture of this field diaphragm is thus at least equal to the interval comprised between two strokes of the graduation of the ruler 4 multiplied by the optical magnifying of the optical sighting device described above.

In the example shown, this field diaphragm 16 is constituted by a cylindrical tube presenting an opaque wall for the light rays and in which an aperture or slot having the shape of a helix 17 is provided, which is transparent.

In the example shown, this helicoidal aperture 17 comprises only one turn and presents a pitch equal to the interval between two adjacent strokes of the graduation of the ruler 4 multiplied by the optical magnifying of the sighting device.

The tubular field diaphragm 16 surrounds the mirror 11 and is closed at one of its extremities by an end wall 18 fast with an axle 19 angularly displaceable with respect to the frame of the machine. This axle 19 carries further a graduated and numbered disc 20 revolving in front of a fixed index as well as a toothed wheel 21, located at its free extremity, in mesh with a pinion 22 driven in rotation by means of a gripping member 23.

For manufacture and regulating, the graduated disc 20 is fixed on the axle 19 so that the index indicates zero when the field diaphragm 16 is in the reference position, that is to say when it defines a portion of the field centered on the stroke $n$ as well as a portion of the field centered on the stroke $n + 1$ of the ruler 4. The corresponding position of the ruler 4 is expressed therefore by a whole number of intervals.

The working of the described reading device is the following:

The vibrating image of a stroke of the graduated ruler 4 causes by its scanning before the helicoidal slot 17 of the field diaphragm, a train of luminous pulses which are caught by the photoelectric cell and the electronic apparatus of the reading device delivers an indication relative to the spacing existing between the centered position of the image and the axis of the portion of field which is delimited by the field diaphragm 16.

With the aid of the gripping member 23, the operator causes the rotation of the field diaphragm 16 until the moment where the measuring instrument indicates zero, that is to say until the moment where the portion of field determined by the position of the field diaphragm 16 is centered on the centered position of the image of the vibrating stroke of the precision ruler.

It suffices then to read in front of an index the angular position of the graduated disc 20 and thus the position of the field diaphragm 16 to know the spacing existing between the position sighted on the ruler 4 and the position which was expressed by a whole number of intervals. The disc 20 may carry a division presenting thousand marks equidistant on its periphery, so that one may read with precision the sighted position of the ruler with a precision equal to one thousandth of the interval separating two strokes of the graduation of this ruler 4. As this ruler 4 may carry a division, the strokes of which may, for example, be distant one from another by 0.2 mm, a reading precision of $2.10^{-4}$ mm, i.e. 0.2 $\mu$m may be realized.

The described reading device thus enables to carry out an interpolation or measure between two strokes of a graduation as a zero measurement.

In other words, the optical train from the light source 5 up to the movable scale 4 and back to the oscillating mirror 9 is fixed. The oscillating mirror causes the image of the scale marking on scale 4 to oscillate. Movement of the marking relative to the fixed optical axis causes this oscillation to shift in phase, and the phase comparator 14 picks up changes of phase and registers them on the indicator 15. When the markings on disc 20 are at zero, and the optical axis coincides with a scale marking, then there is no phase difference and indicator 15 reads zero. But when scale 4 is shifted and a Vernier-type reading between graduations is required, then slot 17 must be shifted by rotation of disc 20 so as to bring the reading of indicator 15 back to zero; and when it returns to zero, then the reading on disc 20 gives an accurate Vernier reading of the fractional interval between markings on scale 4.

It is evident that in a variant, the positions of the luminous source 5 and of the photoelectric cell 12 could be permutated. In this case, one realizes an optical scanning of the ruler by means of the image of the field diaphragm 16. The result obtained is the same in both cases.

Another variant would consist in using a transparent ruler and in forming the image of said ruler by means of a diascopic lighting according to known techniques.

It is further to be noted that if one causes a displacement of the ruler 4 by means of the screw 1, this displacement may be accurately followed. As a matter of fact, it suffices to turn the field diaphragm 16 by means of the gripping member 23 to maintain the portion of the helicoidal slot 17, situated in a plane which is tangent to the surface of the field diaphragm 16 and perpendicular to the reflected ray, centered on the centered position of this image to enable to read at each instant the exact position of the ruler 4.

In a variant, the angular displacement of the gripping member 23 and thus the angular displacement of the field diaphragm, could be automatically controlled by means of a servo-mechanism causing a displacement of the said gripping member 23 such that the indication of the measuring instrument 15 be always maintained to zero. In this manner, the position of the field diaphragm 16 is always such that the said portion of the helicoidal slot 17 be centered on the middle position of the projected image.

Since the scanned measuring field is at least equal to the interval between two strokes of the graduation of the ruler 4 and that the pitch of the helicoidal slot 17, taking into account of the optical magnifying, corresponds to this interval, the continuity of the measure is ensured. As a matter of fact, when the ruler 4 has been displaced by a value corresponding to one interval of the graduation, the field diaphragm has effected one complete revolution and the image of the following stroke ($n + 1$) coincides then with the start of the helicoidal slot at the moment where the image of the preceding stroke ($n$) leaves the end of said helicoidal slot.

The present reading device enables thus to follow the displacement of a movable member, since to carry that out, it suffices to drive the field diaphragm 16 in a continuous rotation, to count the number of complete turns of the graduated disc 20 and to read its angular position.

Figure 2:
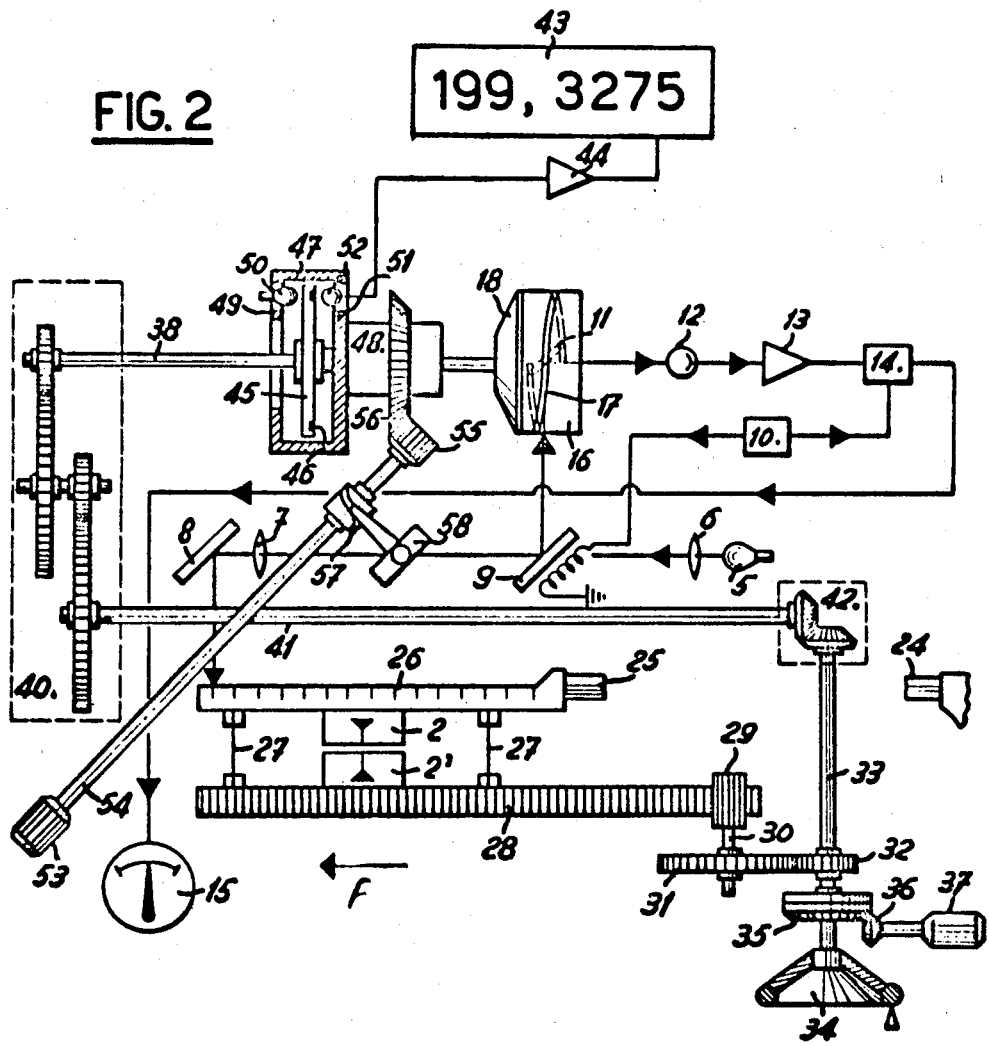
FIG. 2 is a diagram of the second embodiment of the reading device.

The second embodiment shown at FIG. 2 of the drawing illustrates schematically a measuring machine equipped with a photoelectric microscope identical to the one decribed in reference to the first embodiment.

This measuring machine comprises a first fixed measuring abutment 24 and a second measuring abutment 25 fast with one end of the precision ruler 26. This ruler 26 is connected by means of blades springs 27 to a carriage sliding on the frame of the machine and bearing a rack 28 in mesh with a toothed pinion 29 fast with a shaft 30 carrying a toothed wheel 31, itself in mesh with a driving pinion 32 rigidly fixed on a transmission shaft 33 carrying at one of its ends a wheel 34. This shaft 33 carries further a toothed rim 35 in mesh with a pinion 36 fast with a gripping member 37 for fine adjustment.

The precision ruler 26 is thus resiliently connected to the carriage carrying the rack 28. The resiliency of this linkage determines the measuring force having to be exerted on a piece to be measured and which is fixed between the abutments 24 and 25. A device enables to fix this measuring pressure, that is the position of the ruler 26 with respect to the carriage carrying the rack 28. This device being well known it will not be described here in detail; it could be constituted, for example, by an index 2 and a mark 2' having to be set opposite one another.

In this second embodiment, the reading device comprises also a field diaphragm constituted by an opaque cylindrical wall 16 presenting a helicoidal slot 17 having one turn and the pitch of which corresponds to the interval between two successive divisions of the graduation carried by the ruler 26, taking the optical magnifying of the photoelectric microscope into account. The bottom 18 of this field diaphragm is fast with the shaft 38. Further, this shaft is connected through the intermediary of a gear train 40 to an auxiliary shaft 41 driven by the intermediary of a couple of conical pinions 42 by the transmission shaft 33, so that the shaft 38 carrying the field diaphragm 16 is driven in rotation for any angular displacement of the transmission shaft 33. The transmission ratios, on the one hand from the transmission shaft 33 to the rack 28 and, on the other hand, from this transmission shaft 33 to the shaft 38, are such that the shaft 38 carrying the field diaphragm 16 carries out one complete revolution for each displacement of the rack 28 corresponding to the interval separating two successive strokes of the graduation carried by the ruler 26. In this way, the angular position of the field diaphragm 16 corresponds theoretically always to the position of the image of the strokes of the precision ruler 26. This is true as long as the kinematic linkage between the rack 28 and the shaft 38 is precise and without clearance and that the position of the ruler 26 with respect to the rack is fixed.

In this embodiment, the indication of the angular position of the field diaphragm 16 with respect to a reference position, corresponding to the starting point which is chosen arbitrarily for the measurement, is given by a counting device comprising a pulses generator feeding a counter 43 through the intermediary of an amplifier 44, both being of well known type.

The generator is constituted by a disc 45 fast and coaxial with the shaft 38 carrying the field diaphragm 16. This disc 45 is in a transparent material and presents an opaque coating provided, on one annular zone 46, with one thousand or ten thousand marks forming transparent slots on the opaque coating. These slots are uniformly distributed on the periphery of the said annular zone 46.

This disc 45 is surrounded by a housing 47, fast with a hub 48 pivoted on the shaft 38. This housing comprises two faces, a fore one 49 on which a luminous source 50 is fixed and a rear one 51 on which a photoelectric cell 52 is fastened. This luminous source 50 and this photoelectric cell are disposed on a radius corresponding to the one of the annular zone 46 of the disc 45 and located one opposite the other.

In that way, during the rotation of the disc 45, the housing being fixed with respect to the frame of the machine the photoelectric cell 52 delivers a number of electric pulses corresponding to the number of slots passing between the luminous source 50 and this photoelectric cell 52. These electric pulses are counted in the counter 43, the total of which is displayed and corresponds to the distance of which the ruler 26 has been displaced.

In a variant, if one desires to be able to make successive displacements in both directions of the ruler 26 during the measure of a same part, one may use a reversible counter 43 which would be fed by means of a pulses generator having two channels enabling a discrimination of the direction of rotation of the shaft 38. Detectors like that are known and described for example in: "An introduction to numerical control of machine tools," by O.S. Puckle and J.R. Arrowsmith (Chapman and Hall Ltd.) or in: "Die numerische Steuerung von Werkzeugmaschinen" by Wilhelm Simon (Carl Heuser Verlag).

At last, due to the existence of clearances and imprecision in the mechanical transmission between the rack 28 and the shaft 38, and also since the relative positions of the ruler 26 and of the rack 28 are subjected to variations due to the elasticity of the blades 27 which give the measuring force, a correcting device is foreseen. This correcting device comprises a gripping member 53 fast with the end of a regulating rod 54 pivoted on the frame of the machine and comprising at its other extremity a pinion 55 in mesh with a toothed wheel 56 fast and coaxial to the hub 48 of the housing 47 of the generator. Through a rotation of the gripping member 53, the angular position of the housing 47 may be modified, what corresponds to a modification of the reference position.

It is obviously necessary to foresee that the correction acts also on the indications delivered by the measuring apparatus 15. To do that, the regulating rod carries a cam 57 causing, during the rotation of the gripping member 53, the rotation of an optical deflector 58, what causes a displacement of the optical axis of the image of the ruler which is projected on the periphery of the field diaphragm 16 and introduces thus the desired correction. This deflector 58 may be constituted for example by a glass with parallel faces.

It is evident that the cam 57 as well as the pinion 55 and the toothed rim 56 are such that when the housing 47 is in a position corresponding to the reference position, the image of the ruler 26 of the field diaphragm 16 is also in a position corresponding to the reference position.

The working of the measuring machine equipped with the described reading device is the following:

The operator brings, by means of the wheel 34 and of the gripping member 37, the abutment 25 of the ruler 26 in contact with the fixed abutment 24, then he effects a subsequent displacement of the rack 28 until the index 2 of the measuring force indicator is situated in front of the mark 2'. At this moment, the relative displacement of the ruler 26 with respect to the rack 28 is such that the springs blades 27 apply the abutment 25 against the fixed abutment 24 with the desired measuring force.

The operator adjusts then with the aid of the gripping member 53 the zero or the reference position of the reading device. To carry that out, he displaces the housing 47 as well as the deflector 58 until the measuring apparatus 15 be in its zero position. This reference position being fixed, he sets to zero the reversible counter 43 in a known manner.

The operator displaces then, with the aid of the wheel 34, the rack 28 and thus the ruler 26 in the direction of the arrow *f* until the spacing between the frontal faces of the abutments 24 and 25 be sufficient to introduce between them the part to be measured. During this displacement, the counter 43 has totalized the number of pulses delivered by the generator. The part to be measured being set in place, the operator displaces the ruler 26 in the direction opposite to the arrow *f* until the said part be in contact with the two abutments 24 and 25, then he displaces further the rack always in the direction opposite to the arrow *f* until the measuring force is reached, force which is given by the relative position of the ruler 26 with respect to the rack 28. This measuring position is determined by means of the said index 2 and of the mark 2' corresponding to it. During this backward displacement, the counter takes off from the previously registered total a number of pulses corresponding to this reverse stroke of the ruler. At last, the operator adjusts, with the aid of the gripping member 53, the position of the deflector 58 and of the housing 47 so that the measuring apparatus 15 indicates zero. At that time, the exact length of the piece located between the abutments 24 and 25 is displayed by the counter 43.

The working of the photoelectric microscope of this second embodiment is the same as in the first embodiment and will thus not be described here in detail.

The photoelectric microscope of this second embodiment being identical to that of the first embodiment, it is evident that here also the luminous source 5 may be replaced by the photoelectric cell 12 and that the ruler could be transparent and lighted by diascopy.

In view of the foregoing disclosure, therefore, it will be evident that the initially recited objects of the present invention have been achieved.

Although the present invention has been described and illustrated in connection with preferred embodiments, it is evident that modifications and variations may be resorted to without departing from the spirit of the invention, as those skilled in the art will readily understand. Such modifications and variations are considered to be within the purview and scope of the present invention as defined by the appended claims.

Having described our invention, we claim:

1. A high precision reading device of the graduation marks of a precision scale, comprising a photoelectric microscope having an optical sighting unit, means for periodically scanning a measuring field of the scale on either side of a fixed centered position, a photoelectric cell receiving light rays from the scale by way of said scanning means and delivering a train of electrical pulses, said scanning means comprising a diaphragm having an opening therein disposed in the optical path of the photoelectric microscope and in a conjugated plane of the scale, said diaphragm comprising a cylindrical member having a helicoidal slot therein disposed in at least one complete turn about the cylindrical member, the pitch of the helicoidal slot being equal to the interval comprised between two graduation marks of the scale multiplied by the optical magnification of the optical sighting device of the photoelectric microscope, means to rotate the cylindrical member about its axis to move said slot between positions corresponding to portions of the measuring field between different graduation marks on the scale, phase comparator means to compare the position of said received light rays with the position of said cylindrical member, and means rotatable with the cylindrical member to indicate the phase relationship between said light rays and said cylindrical member as a measure of a portion of said interval between said two graduation marks.

2. A reading device as claimed in claim 1, said scanning means also comprising an oscillating mirror for directing said light rays periodically on opposite sides of said slot.

3. A reading device as claimed in claim 1, said rotating means comprising means to retain said cylindrical member stationary in a rotated position to permit reading of said measure.

* * * * *